United States Patent [19]
Burton et al.

[11] 3,907,060
[45] Sept. 23, 1975

[54] MOTOR VEHICLE THEFT-PREVENTION APPARATUS

[75] Inventors: Albert C. Burton, Brewster; William E. McGraw, Hastings-on-Hudson; Thomas V. Savino, Ossining, all of N.Y.

[73] Assignee: Cahs, Inc., Mount Vernon, N.Y.

[22] Filed: Jan. 30, 1974

[21] Appl. No.: 437,730

Related U.S. Application Data
[60] Continuation-in-part of Ser. No. 353,740, April 23, 1973, abandoned, which is a division of Ser. No. 233,179, March 9, 1972, abandoned.

[52] U.S. Cl. ......... 180/114; 123/198 B; 307/10 AT
[51] Int. Cl.² ......................................... B60R 25/04
[58] Field of Search .. 180/114; 123/198 B, 198 DB; 307/10 AT; 340/62, 63; 137/351, 383; 70/243

[56] References Cited
UNITED STATES PATENTS

| | | |
|---|---|---|
| 2,453,236 | 11/1948 | Lazarus.............................. 340/63 |
| 2,515,044 | 7/1950 | Kappel................................ 180/114 |
| 2,637,407 | 5/1953 | Burk et al. ......................... 180/114 |
| 2,695,685 | 11/1954 | Jamison ......................... 180/114 X |
| 2,876,429 | 3/1959 | Noztitz................................ 340/64 |
| 3,174,502 | 3/1965 | Howarth ............................ 137/351 |
| 3,303,836 | 2/1967 | Burleigh......................... 123/198 B |
| 3,358,481 | 12/1967 | Roskowski ........................... 70/243 |
| 3,623,569 | 11/1971 | Wilkins........................... 307/10 AT |

*Primary Examiner*—Kenneth H. Betts
*Attorney, Agent, or Firm*—Brumbaugh, Graves, Donohue & Raymond

[57] ABSTRACT

Apparatus for securing a motor vehicle against theft or loss includes a normally closed, electrically actuated fuel valve arranged in the fuel line of the motor vehicle between the fuel tank and the fuel pump. The fuel valve is actuated by an electric circuit having a hidden switch accessible to the driver. The hidden switch may be a simple two-position toggle switch, a receiver and transmitter system, or a three-terminal switch having an off-hold position with a warning buzzer.

1 Claim, 3 Drawing Figures

MOTOR VEHICLE THEFT-PREVENTION APPARATUS

CROSS-REFERENCE TO RELATED APPLICATIONS

This is a continuation-in-part application of our co-pending application Ser. No. 353,740, filed Apr. 23, 1973 now abandoned, which is, in turn, a divisional application of our application Ser. No. 233,179, filed Mar. 9, 1972, now abandoned.

BACKGROUND OF THE INVENTION

The present invention relates to apparatus for securing motor vehicles, including cars, trucks, buses, and other land vehicles powered by fuel, against unauthorized operation.

Various motor vehicle anti-theft devices are known which provide varying degrees of security for the motor vehicle owner or user. Most of these devices include a lock which requires the use of a combination or key, either to render the vehicle mechanically or electrically operative or to inactivate an alarm when authorized operation is desired.

Other devices require knowledge of the existence and location of a hidden switch: that is, a switch readily accessible to the vehicle operator but hidden from view. Such a switch, which is usually electrical but may be entirely mechanical, can serve any of the same functions as a key-actuated lock.

Key-actuated anti-theft devices are somewhat less than fully secure since any lock which must be mass produced may be picked or otherwise circumvented. The hidden switch-type of anti-theft devices is not subject to this disadvantage; however, once the existence of a hidden switch is known, its location can usually be discovered in time.

SUMMARY OF THE INVENTION

An object of the present invention is to provide a hidden switch-type of anti-theft device for motor vehicles, of which the existence and location cannot readily be discovered.

More particularly, an object of this invention is to provide an anti-theft device for motor vehicles which permits initial starting of the engine and gives no hint of the presence of any switch.

These objects, and others which will become apparent in the discussion that follows, are achieved, according to the present invention, by a normally closed, electrically actuated fuel valve in the fuel line of the motor vehicle between the fuel tank and the fuel pump and an electric circuit, including a hidden switch, for opening the fuel valve when operation of the vehicle is desired.

Because of the normal placement of the fuel valve in motor vehicles, the engine may be started and run for about 40 seconds on the fuel contained in the fuel pump, fuel line, and carburetor when the fuel valve is closed. Thus, if the vehicle is broken into when parked and is started by a thief, the vehicle may be removed from the parking area and driven a short distance. After the vehicle has entered the flow of traffic, its engine will stop and cannot be restarted, unless the fuel valve is opened by throwing the hidden switch.

Because the motor vehicle will have apparently stopped as a result of mechanical failure, the thief will not be immediately apprised of the existence of the hidden security switch. And, even if the thief believes that a security system has caused the vehicle to stop, he will not likely have time to search for the location of the hidden switch, but would abandon the vehicle rather than risk attracting attention and being apprehended.

DESCRIPTION OF THE PREFERRED EMBODIMENTS

Figure 1:
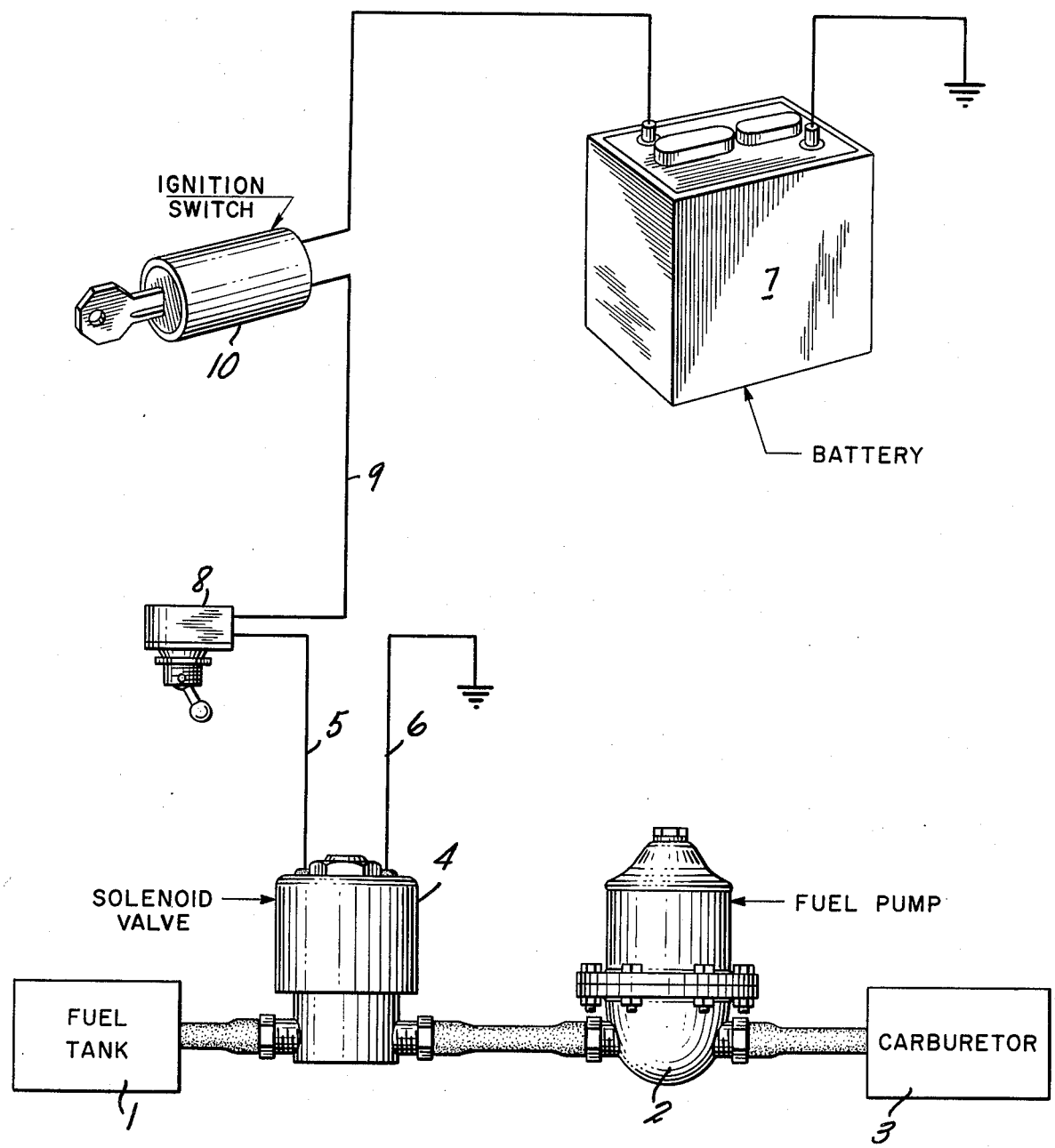
FIG. 1 is a schematic view of one preferred embodiment of a motor vehicle theft-prevention apparatus, according to the present invention, showing a two-terminal, on/off switch.
Figure 2:
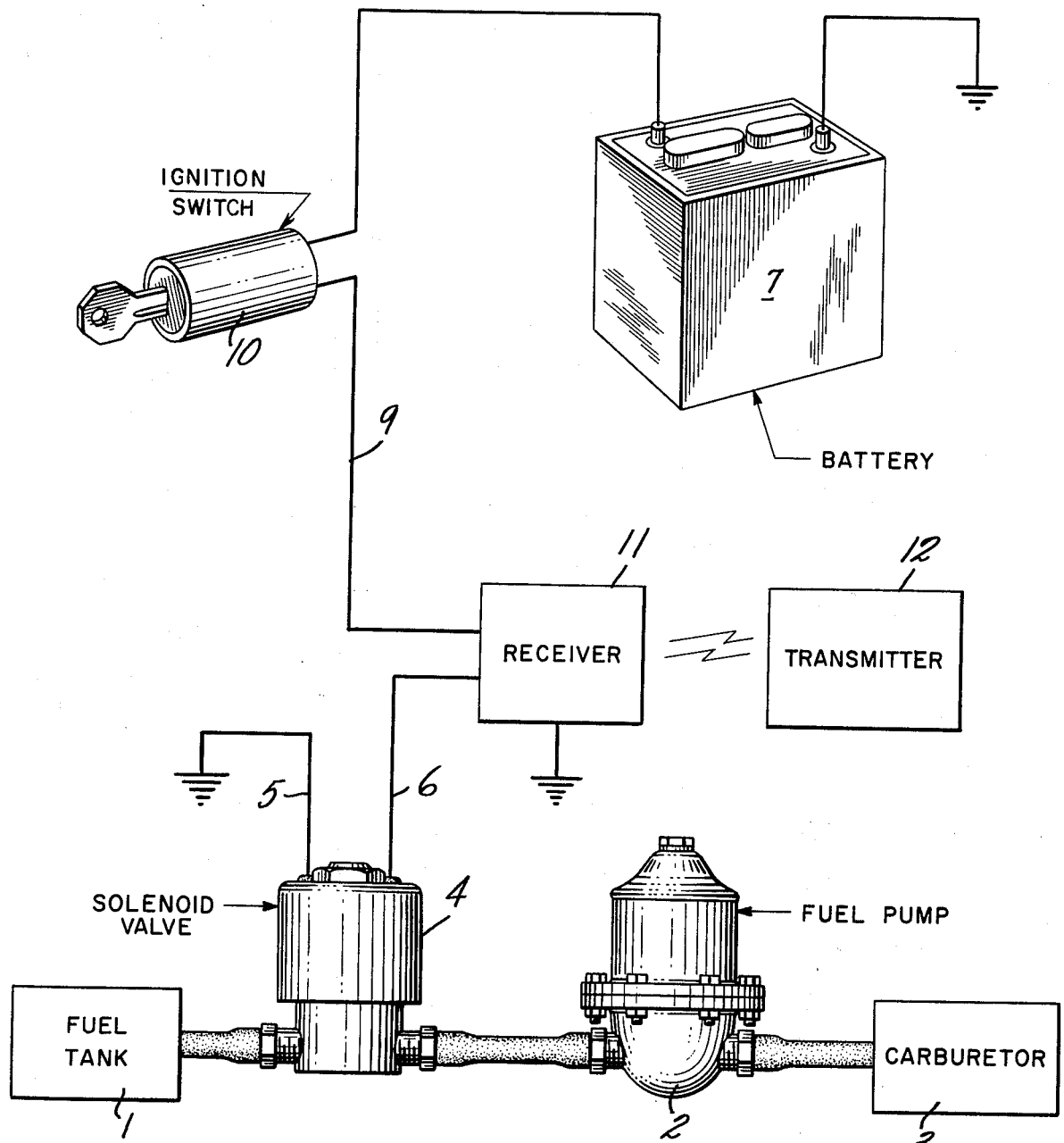
FIG. 2 is a schematic view of another preferred embodiment of a motor vehicle theft-prevention apparatus, according to the present invention, showing a transmitter and receiver system.
Figure 3:
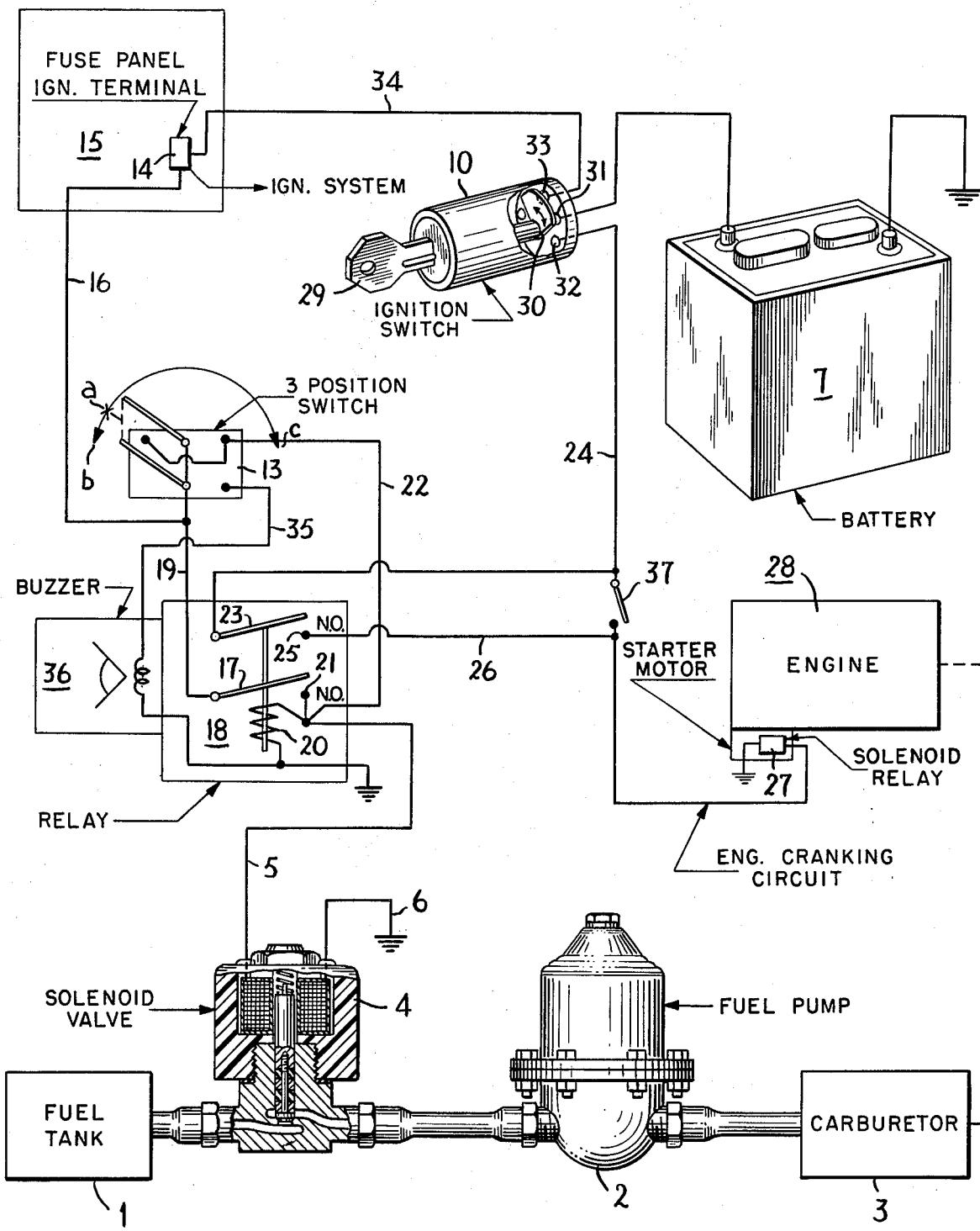
FIG. 3 is a schematic view of another preferred embodiment of the invention showing a three-position switch with a warning buzzer.

The lower parts of FIGS. 1, 2, and 3 show a conventional motor vehicle fuel system comprising a fuel tank 1, a mechanically actuated fuel pump 2, and fuel atomizing means such as a carburetor 3. For example, in a diesel engine, a fuel injection system is used. According to the invention, a solenoid valve 4 is installed in the fuel line at any point, preferably between the fuel tank 1 and the fuel pump 2. The solenoid valve is a two-position, normally closed valve having a 6- or 12-volt D.C. coil connected to external electrical leads 5 and 6. The coil and leads are unpolarized; that is, the solenoid valve is actuated (opened) if direct current is passed through the leads in either direction.

Because of the absence of polarity, either one of the leads 5 and 6 may be grounded and the other connected to either (ungrounded) terminal of battery 7. It is immaterial whether the vehicle employs a positive- or negative-ground electrical system.

In the apparatus shown in FIG. 1, the lead 6 is connected to ground and the lead 5 is connected to a simple two-terminal, on/off toggle switch 8. The toggle switch 8 is mounted in the motor vehicle in any spot convenient to the driver, yet out of sight of a thief. Thus hidden, the existence and location of the toggle switch cannot be readily ascertained.

The other terminal of the toggle switch 8 is connected by an electrical lead 9 to the switched side of the ignition system of the motor vehicle. For example, the lead 9 may be connected to a terminal on the ignition system side of the ignition switch 10. The terminal on the battery side of the ignition switch is connected to the ungrounded pole of the battery 7 to provide a constant source of positive or negative voltage.

In the apparatus shown in FIG. 2, the lead 5 is connected to ground and the lead 6 is connected to one terminal of a receiver 11. The lead 9 from the ignition system side of the ignition switch 10 is connected to another terminal of the receiver.

The receiver 11, like the toggle switch 8, is concealed on the motor vehicle. It is arranged behind the dash, beneath the seat, or at some other spot entirely out of sight, or it is arranged in view but camouflaged in some way so that its real function will not be understood by a thief.

When it receives a signal from a transmitter 12, the receiver 11 electrically connects the lead 6 with the lead 9. The signal can be transmitted in the form of electromagnetic radiation, such as light or radio waves; or of acoustic waves, which may be ultrasonic; or by conduction of electricity or heat, etc. In practice, the transmitter is preferably battery-operated and compact enough to fit in the pocket of the owner or authorized user of the vehicle. Such devices are commercially available for remote control of garage doors, television sets, model airplanes, and the like.

The receiver 11 is grounded and receives its power directly from the lead 9. It is automatically reset whenever the ignition switch 10 is turned off and the voltage on the lead 9 is interrupted. When the ignition switch 10 is turned on again, the receiver 11 is operative to receive a signal from the transmitter 12, but remains in its reset state until a signal is actually transmitted. Upon transmission and receipt of a signal, the receiver sets a self-holding relay or some other type of switch which electrically connects the lead 6 with the lead 9.

Whenever the toggle switch 8 (FIG. 1) is switched to the off position or the receiver 11 (FIG. 2) is reset, the solenoid valve 4 receives no voltage and thus remains closed. If a thief breaks into the motor vehicle and succeeds in jumping the wires to power the ignition system, the engine will start. Although the fuel pump 2 will be unable to draw any fuel from its inlet line, it will empty itself and pump all the fuel in its outlet line to the carburetor 3. A typical motor vehicle engine will operate for approximately 40 seconds on the fuel contained in the fuel pump, the line between the fuel pump and the carburetor, and the carburetor itself. This is calculated to permit the thief to drive the vehicle away with no suspicion of the existence of an anti-theft device so that the thief is not prompted to search for a hidden switch, at least until the engine stops—ordinarily in traffic.

If the owner or any authorized user desires to drive the vehicle, he first turns the toggle switch 8 to the on position or, the ignition switch being on, signals the receiver 11 with the transmitter 12. A voltage is then applied to the solenoid valve so that the valve opens the line from the fuel tank 1 to the fuel pump 2.

In the embodiment of FIG. 3, the theft-prevention apparatus, according to the present invention, includes a hidden switch 13 that has three operating positions: $a$, $b$, and $c$. Positions $a$ and $c$ are "detent" positions; that is, the switch contacts remain in these positions when moved there by the switch throw lever. The position $b$ is a "momentary" position; that is, the switch contacts may be moved into this position but, when the switch throw lever is released, the contacts will return to the position $a$.

The three-position switch 13 is connected to the ignition terminal 14 on the fuse panel 15 of the motor vehicle via a lead 16. This lead 16 is also connected to a "holding contact" 17 of a relay 18 via a lead 19. The holding contact, which is normally open, is actuated by a solenoid 20 that is grounded on one side and is connected on the other to the contact terminal 21, to a lead 22 which supplies a voltage from the three-position switch 13, and to the lead 5 that is connected to the solenoid valve 4.

The relay 18 may include another normally open contact 23, mechanically connected in tandem with the holding contact 17, to supply a voltage from the lead 24 to the contact terminal 25 and, in turn, to a lead 26 that is connected to the solenoid relay 27 in the starting or cranking circuit of the motor vehicle engine 28. A voltage is applied to the lead 24 from the battery 7 when the key 29 of the ignition switch 10 is turned all the way to the right, to the start position, so that the sliding contact 30 closes the circuit between the terminal 31, which is connected to the battery, and the terminal 32, which is connected to the lead 24. Whenever the ignition switch is on (the position illustrated), the sliding contact 30 also closes the circuit between the terminal 31 and the terminal 33, which is connected to the line 34, providing voltage to the ignition terminal 14.

Whenever the three-position switch 13 is in position $c$, the voltage on lead 16 is applied to a lead 35 that is connected to a signaling device 36 attached to the relay 18. This signaling device 36 is a buzzer, light, or some similar alarm which is capable of alerting the driver of the motor vehicle.

A switch 37 may be provided between the leads 24 and 26 to shunt or by-pass the contact 23 of the relay 18 when desired.

The theft-prevention device illustrated in FIG. 3 operates as follows:

In the central position, or detent position $a$, the three-position switch 13 is off so that the solenoid valve 4 receives no voltage through the relay 18 and remains closed. The position $a$ is, therefore, similar to the off position of the toggle switch 8 of FIG. 1 and the "reset" position of the receiver 11 of FIG. 2. In this position, the motor vehicle cannot be driven for any appreciable distance and is, therefore, effectively secured against theft or loss.

In order to start the engine of the vehicle, the operator turns the key 29 towards the right so that the sliding contact 30 connects the terminals 31 and 33, applying a voltage to the ignition terminal 14 and the contacts of the three-position switch 13. The operator then moves the contacts of the switch 13 into the momentary position $b$, providing a voltage via lead 22 to the solenoid 20 of the relay 18. The solenoid 20 actuates this relay, closing the contacts 17 and 23. The holding contact 17 receives current through the line 19 and maintains a voltage across the solenoid 20 so that the relay 18 remains closed, even after the operator permits the three-position switch 13 to return to the detent position $a$.

Thus, from the moment that the three-position switch 13 is moved into position $b$ until the ignition switch 10 is switched to the off position, a voltage will be applied to the lead 5 and, in turn, to the solenoid valve 4, opening the fuel line from the fuel tank 1 to the fuel pump 2.

The key 29 of the ignition switch 10 is then turned by the vehicle operator to the start position so that the sliding contact 30 touches all three terminals 31, 32, and 33. When this occurs, a voltage is maintained to the ignition terminal 14 via lead 34 and a voltage is applied via lead 24, the contact 23 and the lead 26 (assuming switch 37 is in the open position) to the solenoid relay 27 of the engine cranking circuit, permitting the engine to be started in the normal fashion. If the three-position switch 13 has not been initially moved to the momentary position $b$, the contact 23 of the relay 18 will not be closed, thus inhibiting the operation of the engine starter. Unauthorized operation of the motor vehicle will, therefore, be effectively prevented. If, in accordance with the present invention, it is desired to allow the engine 28 to start and to operate the vehicle for a short period using the fuel in the fuel pump 2 and the carburetor 3, the lead 24 is connected to the lead 26 by the switch 37 to apply a voltage directly to the solenoid relay 27, by-passing the contact 23.

To provide an over-ride for the theft-prevention device, permitting use of the motor vehicle by authorized persons (such as with valet parking) who do not know of the existence, or are unfamiliar with the operation, of the theft-prevention device, the hidden switch 13 may be placed in the detent position *c*. In position *c*, the voltage on lead 16 is maintained to the lead 22 and, thus, to the solenoid valve 4 so that this valve remains open for the normal passage of fuel. In this position *c*, the alarm 36 is also energized via the lead 35, alerting the driver that the system is in the over-ride position.

It will be understood that the present invention is susceptible to various modifications, changes, and adaptations as will occur to those skilled in the art. It is, therefore, intended that the scope of the present invention be limited only by the following claims or their equivalents.

We claim:

1. In a motor vehicle having a fuel tank, a fuel pump, and fuel atomizing means, apparatus for securing the vehicle when parked, comprising in combination:

a. an electrically actuated fuel valve arranged in the fuel line between said fuel tank and said fuel pump; and b. valve actuating means, electrically connected to said fuel valve, for applying a voltage to operate said fuel valve, said valve actuating means comprising:

i. a multi-throw switch, arranged on said motor vehicle and hidden from view, having a detent on position, a detent off position, and a momentary on position;

ii. a first electrical connection between said multi-throw switch and a source of voltage on the switched side of the ignition system of said motor vehicle; and iii. a second electrical connection between said multi-throw switch and said fuel valve, said second connection including relay means, connected to said source of voltage, said multi-throw switch and said fuel valve, having a self-holding contact for maintaining the electrical connection between said multi-throw switch and said fuel valve, once actuated, as long as said source of voltage is present.

* * * * *